(12) United States Patent
Jiang et al.

(10) Patent No.: US 12,075,725 B2
(45) Date of Patent: Sep. 3, 2024

(54) **MOWING METHOD FOR COMPENSATORY GROWTH OF DESERT PLANT *ANABASIS APHYLLA***

(71) Applicant: SHIHEZI UNIVERSITY, Shihezi (CN)

(72) Inventors: Ping Jiang, Shihezi (CN); Jianbing Ge, Shihezi (CN); Jing Ye, Shihezi (CN)

(73) Assignee: SHIHEZI UNIVERSITY, Shihezi (CN)

( * ) Notice: Subject to any disclaimer, the term of this patent is extended or adjusted under 35 U.S.C. 154(b) by 0 days.

(21) Appl. No.: 18/592,360

(22) Filed: Feb. 29, 2024

(65) Prior Publication Data

US 2024/0196795 A1     Jun. 20, 2024

Related U.S. Application Data

(63) Continuation of application No. PCT/CN2023/074317, filed on Feb. 3, 2023.

(30) Foreign Application Priority Data

Aug. 9, 2022  (CN) .......................... 202210950255.9

(51) Int. Cl.
*A01D 45/00*     (2018.01)
*A01D 43/063*    (2006.01)

(52) U.S. Cl.
CPC ......... *A01D 43/0638* (2013.01); *A01D 45/00* (2013.01)

(58) Field of Classification Search
CPC ........ A01D 45/00–45/30; A01D 46/00–46/30; A01G 22/00–22/67
See application file for complete search history.

(56) References Cited

U.S. PATENT DOCUMENTS

| 11,528,857 B2 | 12/2022 | Shen et al. |
| 2015/0305250 A1 | 10/2015 | Wilson et al. |
| 2018/0288939 A1 | 10/2018 | Bassett |

FOREIGN PATENT DOCUMENTS

| CN | 2492059 Y | 5/2002 |  |
| CN | 103733851 A | 4/2014 |  |
| CN | 108901336 A | * 11/2018 | ........... A01D 45/002 |
| CN | 113068556 A | 7/2021 |  |
| CN | 215774383 U | 2/2022 |  |
| CN | 216017835 U | 3/2022 |  |
| CN | 216017907 U | 3/2022 |  |
| CN | 114402929 A | 4/2022 |  |
| CN | 217470720 U | 9/2022 |  |

(Continued)

*Primary Examiner* — Adam J Behrens
*Assistant Examiner* — Madeline I Runco

(57) ABSTRACT

Disclosed is a mowing method for compensatory growth of a desert plant *Anabasis aphylla*, falling into the field of plant mowing methods. The mowing method includes the following steps: step 1: mounting a frame body on movable equipment; step 2: driving the movable equipment to move a device to a working area; and step 3: intermittently operating the movable equipment to allow an area formed by a push plate I, baffle plates II and a push plate II to be exactly opposite to a suitable number of *Anabasis aphylla*. The present disclosure is to provide a mowing method for compensatory growth of a desert plant *Anabasis aphylla* to solve the technical problem, facilitating the mowing of *Anabasis aphylla*.

9 Claims, 8 Drawing Sheets

(56) References Cited

FOREIGN PATENT DOCUMENTS

| GB | 313336 A | 6/1929 |
|----|----------|--------|
| JP | 1991198712 A | 8/1991 |
| JP | 1992360629 A | 12/1992 |
| JP | 2011516093 A | 5/2011 |

* cited by examiner

MOWING METHOD FOR COMPENSATORY GROWTH OF DESERT PLANT *ANABASIS APHYLLA*

CROSS-REFERENCE TO RELATED APPLICATIONS

This application is a continuation of PCT/CN2023/074317, filed Feb. 3, 2023 and claims priority of Chinese Patent Application No. 202210950255.9, filed on Aug. 9, 2022, the entire contents of which are incorporated herein by reference.

TECHNICAL FIELD

The present disclosure relates to the field of plant mowing methods, and specifically to a mowing method for compensatory growth of a desert plant *Anabasis aphylla*.

BACKGROUND

*Anabasis aphylla*, subshrub, is 5-20 cm high, and has black-brown stout roots, woody stems with many grayish-brown branches, and gray-white branchlets usually with annular cracks. Branches in a current year are yellowish green, most of which emanate from the top of twigs in pairs, usually with 4-8 internodes, unbranched or with a few branches in the upper part. The internodes are smooth or have papillae. The internodes at the lower part are subterete, up to 2.5 cm long, and the internodes at the upper part are shorter and edged.

Generally growing in desert areas, *Anabasis aphylla* needs to be mowed in order to grow, but the large-scale harvesting equipment is limited in use. Generally, cutting is carried out manually and then the cut *Anabasis aphylla* are gathered by picking up manually, which is more labor-intensive and less efficient.

SUMMARY

The present disclosure is to provide a mowing method for compensatory growth of a desert plant *Anabasis aphylla* to solve the technical problem, facilitating the mowing of *Anabasis aphylla*.

The present disclosure adopts the following technical solutions to realize an objective of the present disclosure.

A mowing method for compensatory growth of a desert plant *Anabasis aphylla* includes the following steps of:
  step 1: mounting a frame body on removable equipment;
  step 2: driving the movable equipment to move a device to a working area;
  step 3: intermittently operating the movable equipment to allow an area formed by a push plate I, baffle plates II and a push plate II to be exactly opposite to a suitable number of *Anabasis aphylla*;
  step 4: starting a motor, allowing the push plate I, the baffle plates II and the push plate II to encircle *Anabasis aphylla* driven by relevant elements, pushing, by the push plate I and the push plate II, *Anabasis aphylla* to move towards the middle, and pushing, by a transverse plate, *Anabasis aphylla* to form into a > shape, with an opening towards the push plate II;
  step 5: contacting, by a cutting knife, *Anabasis aphylla* and cutting the same along a position slightly above the transverses plate; and
  step 6: starting the motor in reverse to move the transverse plate in reverse, and *Anabasis aphylla* falling onto the transverse plate until the transverse plate swings to allow *Anabasis aphylla* to fall onto a bottom plate of the frame body, and starting the motor to restore the transverse plate to be horizontal.

Symmetrically arranged circular grooves and straight grooves are disposed on the frame body, the symmetrically arranged circular grooves being communicated with the straight grooves, and symmetrically arranged circular arc grooves being disposed on the frame body; the frame body is fixedly connected to the motor, an output shaft of the motor being fixedly connected to a threaded rod, and two reverse threads of the threaded rod being threadedly connected to corresponding transverse grooves; sliding blocks II being embedded in the symmetrically arranged transverse grooves, the symmetrically arranged sliding blocks II being fixedly connected to round rods II, and the symmetrically arranged round rods II matching the corresponding circular grooves and the straight grooves, and being fixedly connected to vertical grooves I; one of the vertical grooves I is fixedly connected to the push plate I, the symmetrically arranged push plate I being fixedly connected to symmetrically arranged baffle plates II; the other vertical groove I is fixedly connected to the push plate II, symmetrically arranged grooves being disposed on the push plate II, and the symmetrically arranged baffle plates II matching the symmetrically arranged grooves; a sliding block III is embedded in the other vertical groove I, the sliding block III being fixedly connected to a bending rod, the bending rod being fixedly connected to a vertical plate, the vertical plate being connected to a center shaft of a gear II via a bearing, and the center shaft of the gear II being fixedly connected to a transverse plate; and the push plate II is fixedly connected to an L-shaped rod, the L-shaped rod being fixedly connected to a gear rack II, and the gear II matching the gear rack II.

As a further definition of the technical solution, the frame body is fixedly connected to symmetrically arranged square blocks I, the symmetrically arranged square blocks I being fixedly connected to a transverse rod, and the transverse rod passing through the symmetrically arranged transverse grooves.

As a further definition of the technical solution, the frame body is fixedly connected to symmetrically arranged square blocks II, the symmetrically arranged square blocks II being fixedly connected to vertical rods, and the vertical rods passing through transverse grooves I, sliding blocks I being embedded in the symmetrically arranged transverse grooves I, the symmetrically arranged sliding blocks I being fixedly connected to round rods I, the symmetrically arranged round rods I being arranged in the symmetrically arranged circular arc grooves, and the round rods passing through the sliding blocks III.

As a further definition of the technical solution, one of the transverse grooves I is fixedly connected to a gear rack I, and the frame body is connected to a center shaft of a gear I via a bearing, the gear I being engaged with the gear rack I, a center shaft of the gear I being fixedly connected to a circular plate, and an eccentric position of the circular plate being fixedly connected to a round rod III.

As a further definition of the technical solution, the frame body is fixedly connected to a guide plate, a round rod III is arranged in a vertical groove II, the vertical groove II is fixedly connected to a square rod, and the square rod passes through the guide plate and is fixedly connected to a cutting knife.

As a further definition of the technical solution, the vertical plate is fixedly connected to an L-shaped plate, the L-shaped plate being fixedly connected to one end of a spring, and the other end of the spring being fixedly connected to the transverse plate.

As a further definition of the technical solution, the frame body is rotatably connected to a baffle plate, the baffle plate being fixedly connected to a handle.

As a further definition of the technical solution, the baffle plate is threadedly connected to the frame body via symmetrically arranged top screws.

As a further definition of the technical solution, upon the motor is started, the motor drives the threaded rod to rotate, the threaded rod drives the transverse grooves to move along the transverse rod, and the transverse grooves drive the sliding blocks II to move; the sliding blocks II drive the round rods II to move along the circular grooves, and the round rods II, meanwhile, drive the sliding blocks II to move along the transverse grooves, and drive the vertical grooves I to swing, the vertical grooves I drive the push plate I, the baffle plates II, the push plate II, the L-shaped rod and the gear rack II to swing, and the round rods II enter the straight grooves; the baffle plates II face the groove exactly and enter the groove II; the vertical groove I drives the sliding blocks III to swing, the sliding blocks III drive the round rod I to move along the circular arc grooves, the round rod I drives the sliding blocks I to move along the transverse grooves I; and the sliding blocks I drive the transverse grooves I to move along the vertical rods; the sliding blocks III drive the bending rod, the vertical plate, the L-shaped plate, the spring, the gear II and the transverse plate to swing; when the gear II is engaged with the gear rack II, the gear II rotates to drive the transverse plate to swing, and the transverse plate compresses the spring and swings in the direction close to a center of the bottom plate of the frame body, allowing Anabasis aphylla on the transverse plate to fall onto the bottom plate of the frame body in a sliding manner along the transverse plate; and the transverse groove I drives the gear rack I to move, the gear rack I drives the gear I and the circular plate to rotate, the circular plate drives the round rod III to swing along the vertical groove II, the round rod III drives the vertical groove II to move reciprocally, the vertical groove II drives the square rod to move along the guide plate, and the square rod drives the cutting knife to move, allowing the cutting knife to contact Anabasis aphylla and cut the same.

As a further definition of the technical solution, when more Anabasis aphylla are in the frame body, the top screws are loosened, and the baffle plate is swung to take out Anabasis aphylla.

Compared with the prior art, the present disclosure has the following advantages and positive effects.

1. According to the present disclosure, by arranging the circular grooves, the straight grooves and the circular arc grooves, the push plate I, the baffle plates II and the push plate II encircle Anabasis aphylla driven by the relevant elements; the push plate I and the push plate II push Anabasis aphylla to move towards the middle; the transverse plate pushes Anabasis aphylla to form into a > shape, with an opening towards the push plate II, facilitating the cutting knife to cut Anabasis aphylla; and after being cut, Anabasis aphylla falls automatically onto the transverse plate under the effect of "> shape", realizing the initial collection of Anabasis aphylla.

2. According to the present disclosure, the gear II is engaged with the gear rack II; when the gear II is not engaged with the gear rack II, the transverse plate keeps horizontal by utilizing the elastic effect of the spring; and when the gear II is engaged with the gear rack II, the transverse plate swings in the direction close to the center of the bottom plate of the frame body, which facilitates Anabasis aphylla to fall onto the bottom plate of the frame body along the transverse plate, realizing the collection of Anabasis aphylla.

3. According to the present disclosure, by clever design, manually cutting and picking up of Anabasis aphylla is replaced, effectively replacing manpower, and improving work efficiency.

Figure 1:
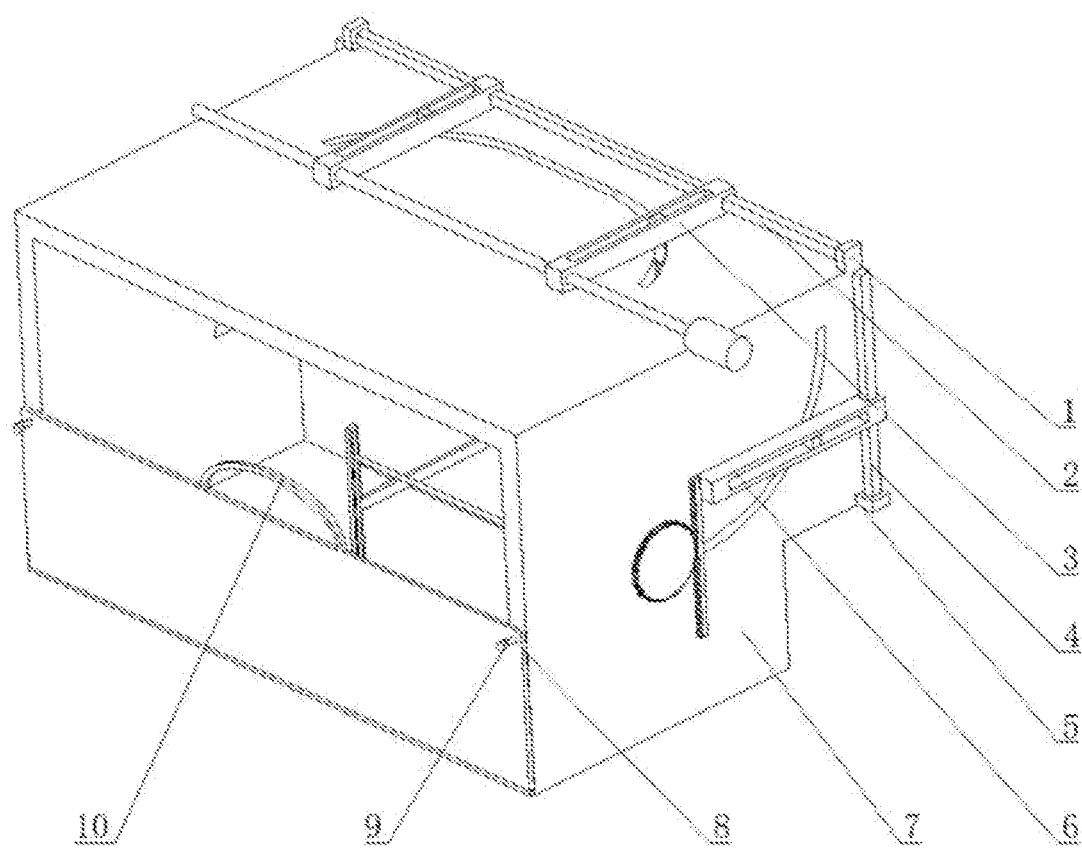
FIG. 1 is a three-dimensional structural schematic diagram I according to the present disclosure.
Figure 2:
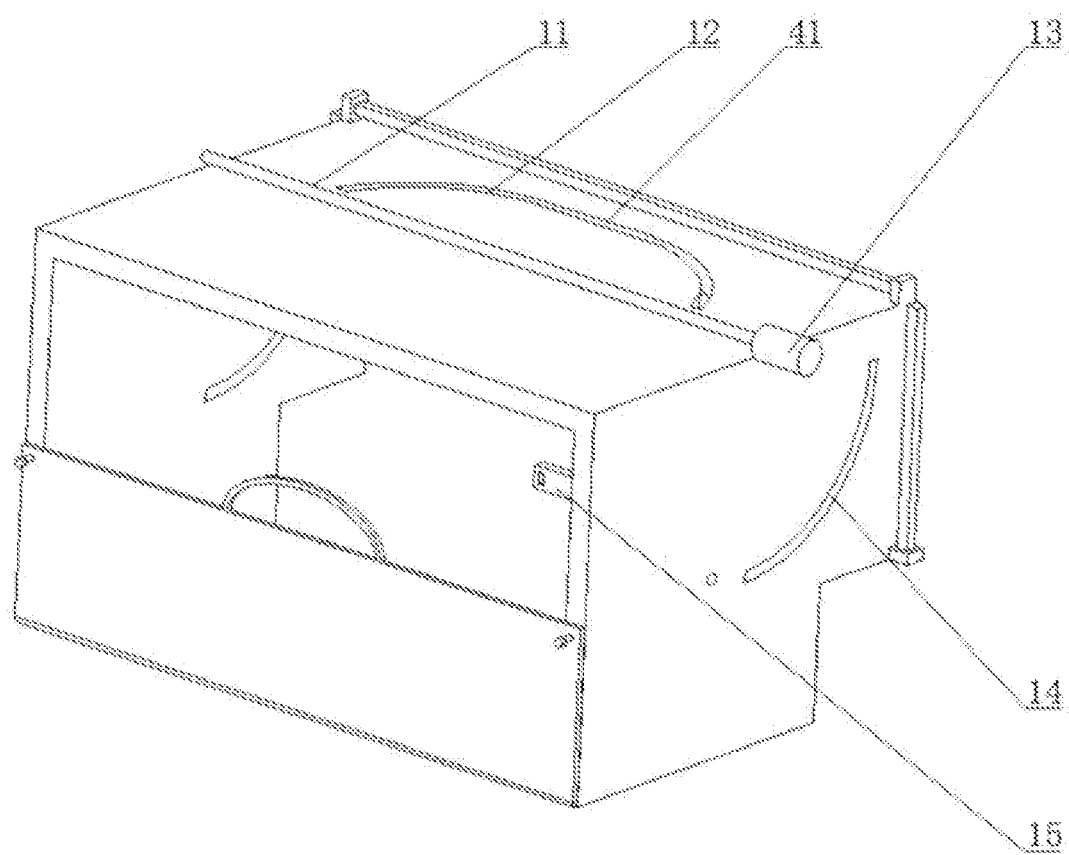
FIG. 2 is a local three-dimensional structural schematic diagram I according to the present disclosure.
Figure 3:
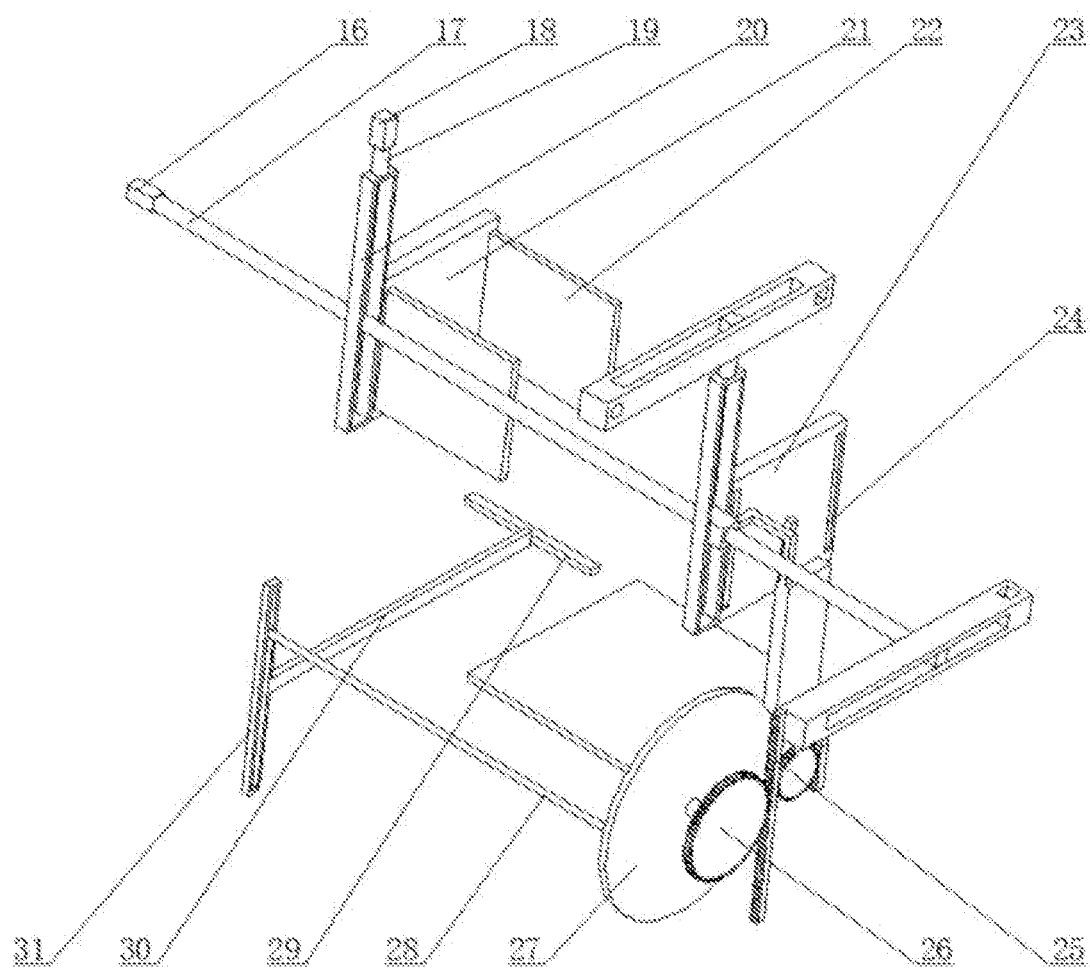
FIG. 3 is a local three-dimensional structural schematic diagram II according to the present disclosure.
Figure 4:
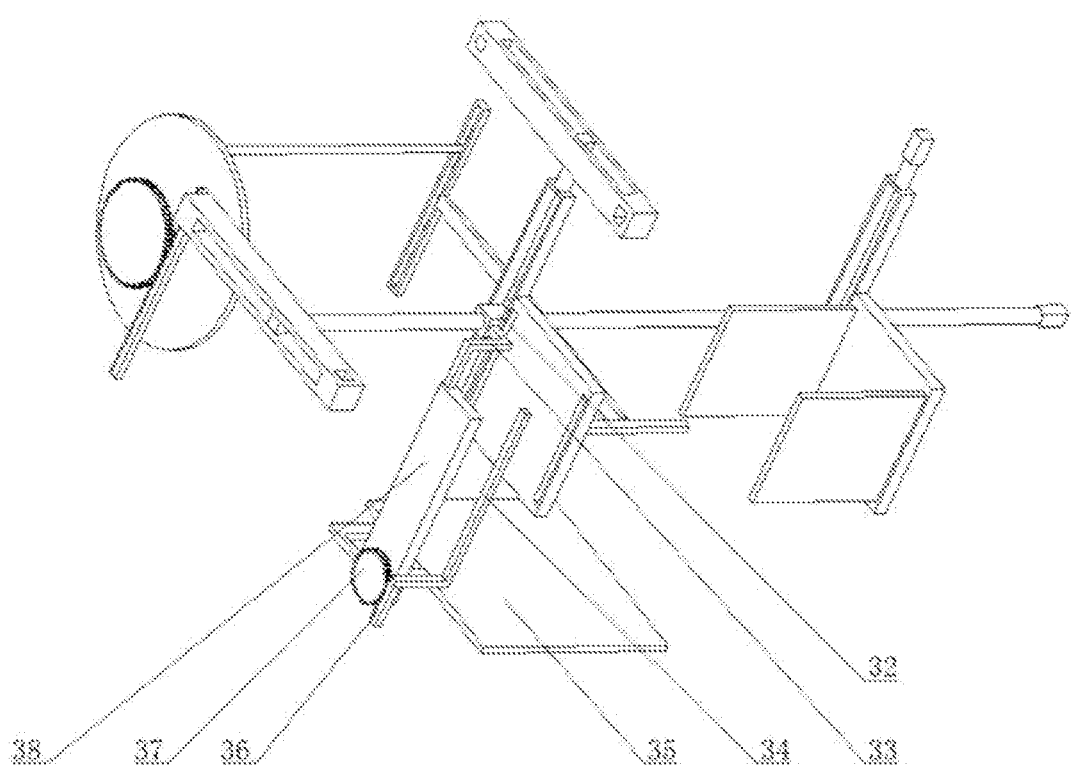
FIG. 4 is a local three-dimensional structural schematic diagram III according to the present disclosure.
Figure 5:
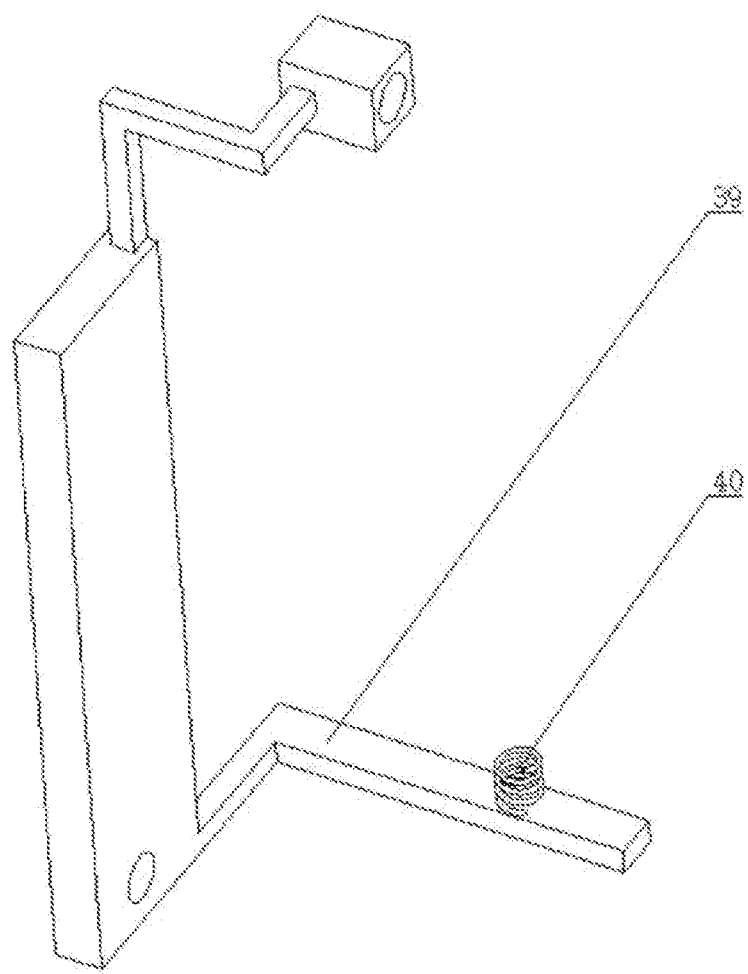
FIG. 5 is a local three-dimensional structural schematic diagram IV according to the present disclosure.
Figure 6:
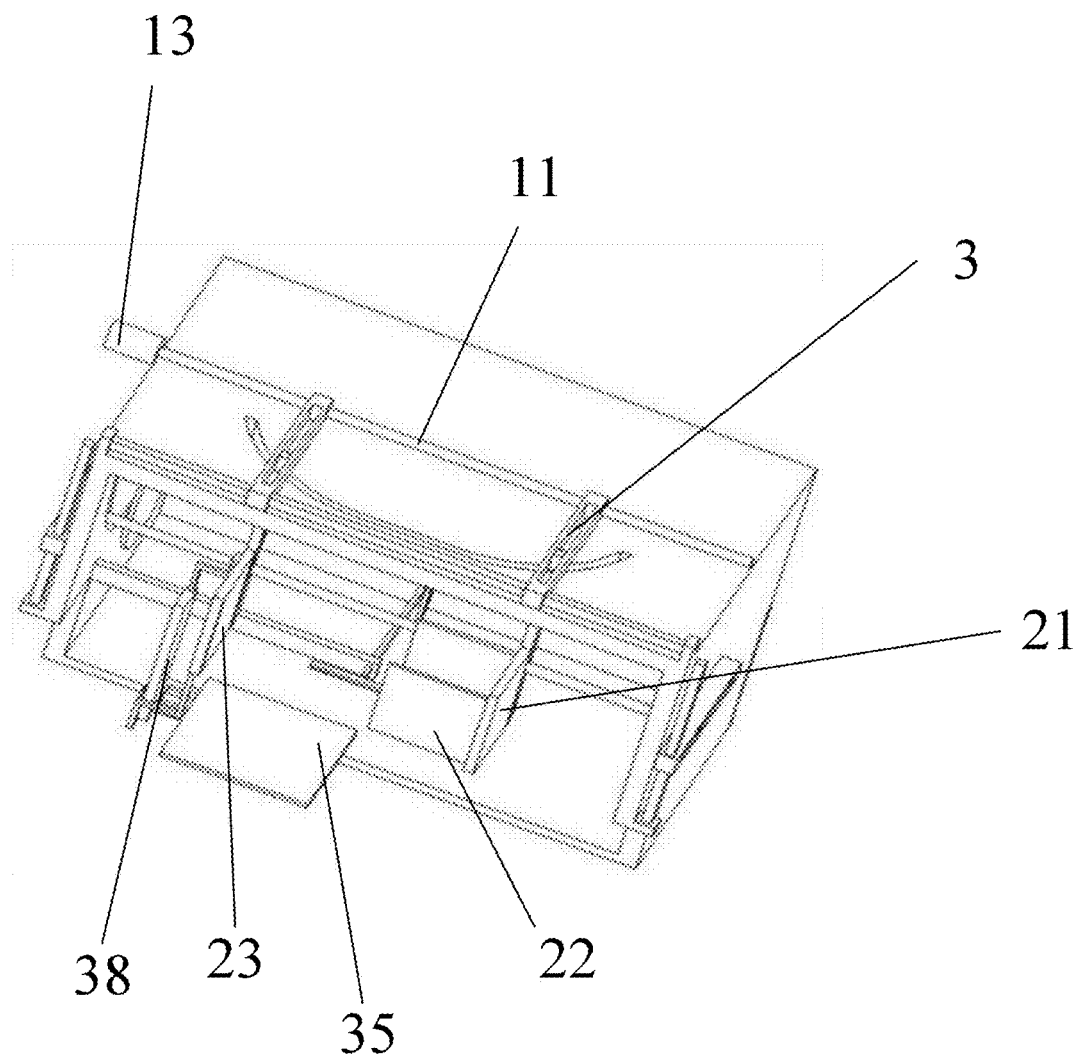
FIG. 6 is a three-dimensional structural schematic diagram II according to the present disclosure.
Figure 7:
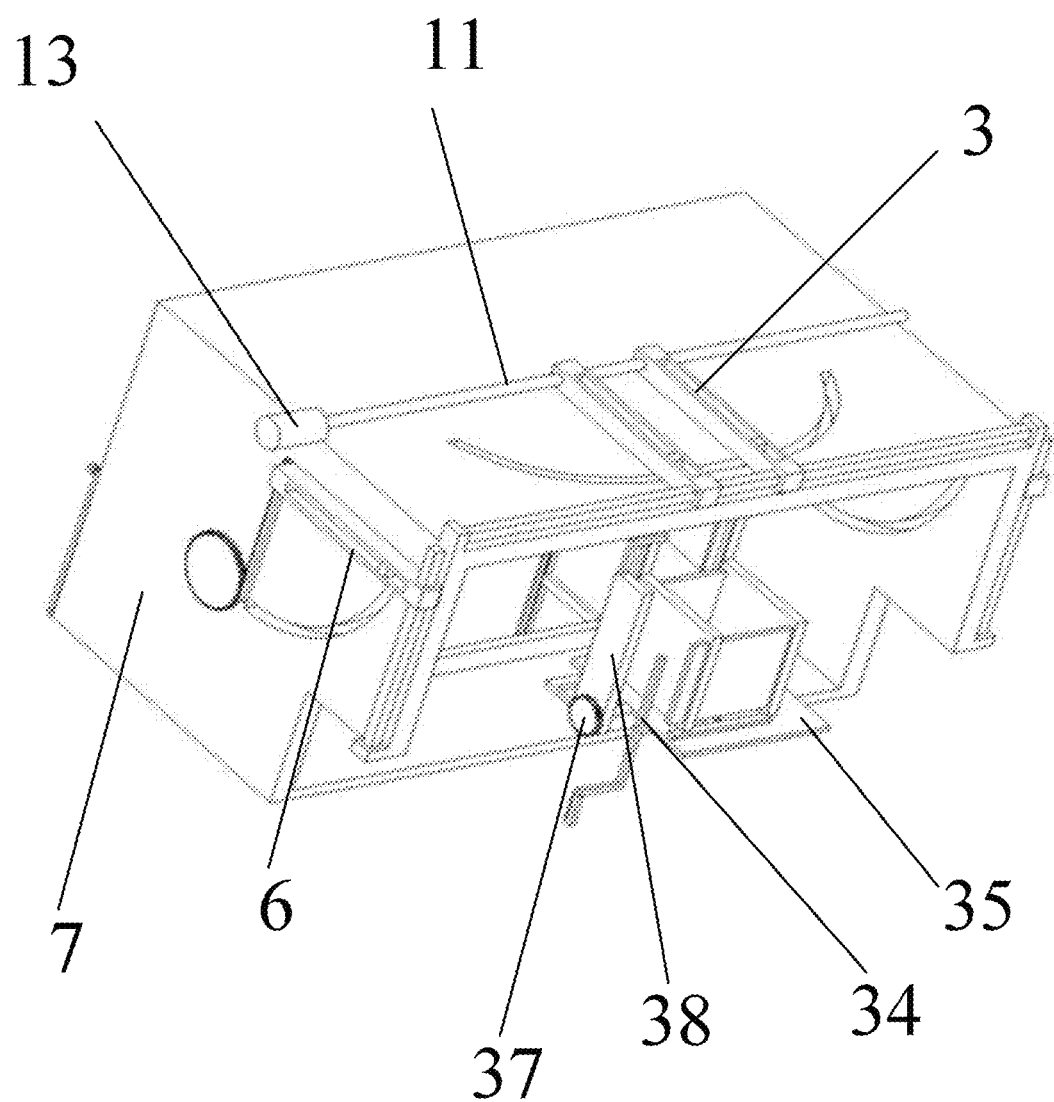
FIG. 7 is a three-dimensional structural schematic diagram III according to the present disclosure.
Figure 8:
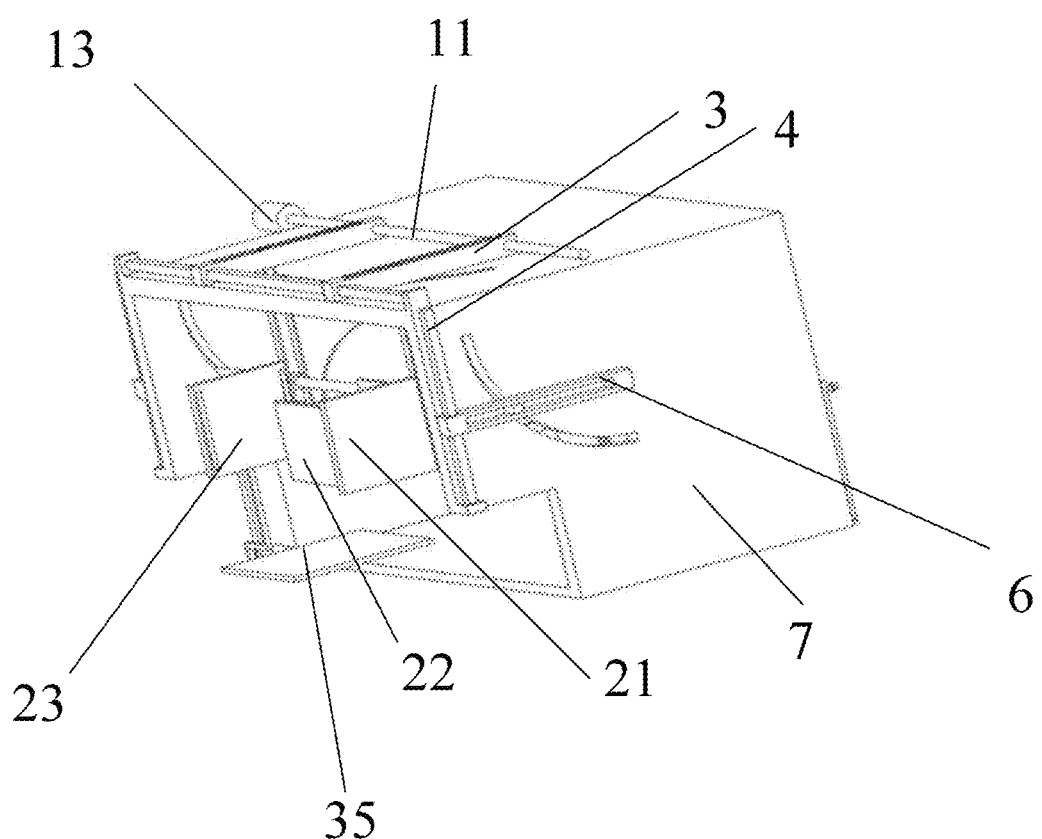
FIG. 8 is a three-dimensional structural schematic diagram IV according to the present disclosure.

Reference numerals and denotations thereof: 1—square block I, 2—transverse rod, 3—transverse groove, 4—vertical rod, 5—square block II, 6—transverse groove I, 7—frame body, 8—baffle plate I, 9—top screw, 10—handle, 11—threaded rod, 12—circular groove, 13—motor, 14—circular arc groove, 15—guide plate, 16—sliding block I, 17—round rod I, 18—sliding block II, 19—round rod II, 20—vertical groove I, 21—push plate I, 22—baffle plate II, 23—pusher plate II, 24—groove, 25—gear rack I, 26—gear I, 27—circular plate, 28—round rod III, 29—cutting knife, 30—square rod, 31—vertical groove II, 32—sliding block III, 33—bending rod, 34—L-shaped rod, 35—transverse plate, 36—gear rack II, 37—gear II, 38—vertical plate, 39—L-shaped plate, 40—spring, and 41—straight groove.

DETAILED DESCRIPTION

One specific embodiment of the present disclosure is described in detail below, but it is to be understood that the scope of protection of the present disclosure is not limited by the specific embodiment.

The present disclosure includes the following steps.

At step 1, a frame body 7 is mounted on movable equipment.

At step 2, the movable equipment is driven to move a device to a working area.

At step 3, the movable equipment is operated intermittently to allow an area formed by a push plate I 21, baffle plates II 22 and a push plate II 23 to be exactly opposite to a suitable number of Anabasis aphylla.

At step 4, the motor 13 is started, allowing the push plate I 21, the baffle plates II 22 and the push plate II 23 to encircle Anabasis aphylla driven by relevant elements; the push plate I 21 and the push plate II 23 push Anabasis aphylla to move towards the middle, and a transverse plate 35 pushes Anabasis aphylla to form into a > shape, with an opening towards the push plate II 23.

At step 5, a cutting knife 29 contacts *Anabasis aphylla* and cuts the same along a position slightly above the transverses plate 35.

At step 6: the motor 13 is started in reverse to move the transverse plate 35 in reverse; *Anabasis aphylla* falls onto the transverse plate 35 until the transverse plate 35 swings to allow *Anabasis aphylla* to fall onto a bottom plate of the frame body 7; and the motor 13 is started to restore the transverse plate 35 to be horizontal.

Symmetrically arranged circular grooves 12 and straight grooves 41 are disposed on the frame body 7, the symmetrically arranged circular grooves 12 are communicated with the straight grooves 41, and symmetrically arranged circular arc grooves 14 are disposed on the frame body 7. The frame body 7 is fixedly connected to the motor 13, an output shaft of the motor 13 is fixedly connected to a threaded rod 11, and two reverse threads of the threaded rod 11 are threadedly connected to corresponding transverse grooves 3. Sliding blocks II 18 are embedded in the symmetrically arranged transverse grooves 3, and the symmetrically arranged sliding blocks II 18 are fixedly connected to round rods II 19. The symmetrically arranged round rods II 19 match the corresponding circular grooves 12 and the straight grooves 41, and fixedly connected to vertical grooves I 20. One of the vertical grooves I 20 is fixedly connected to the push plate I 21, and the symmetrically arranged push plate I 21 is fixedly connected to the symmetrically arranged baffle plates II 22. The other vertical groove I 20 is fixedly connected to the push plate II 23, and symmetrically arranged grooves 24 are disposed on the push plate II 23. The symmetrically arranged baffle plates II 22 match the symmetrically arranged grooves 24. A sliding block III 32 is embedded in the other vertical groove I 20, and the sliding block III 32 is fixedly connected to a bending rod 33. The bending rod 33 is fixedly connected to a vertical plate 38, and the vertical plate 38 is connected to a center shaft of a gear II 37 via a bearing, and the center shaft of the gear II 37 is fixedly connected to the transverse plate 35. The push plate II 23 is fixedly connected to an L-shaped rod 34, the L-shaped rod 34 is fixedly connected to a gear rack II 36, and the gear II 37 matches the gear rack II 36.

The frame body 7 is fixedly connected to symmetrically arranged square blocks I 1, the symmetrically arranged square blocks I 1 being fixedly connected to a transverse rod 2, and the transverse rod 2 passing through the symmetrically arranged transverse grooves 3.

The frame body 7 is fixedly connected to symmetrically arranged square blocks II 5, the symmetrically arranged square blocks II 5 being fixedly connected to vertical rods 4, and the vertical rods 4 passing through transverse grooves I 6, sliding blocks I 16 being embedded in the symmetrically arranged transverse grooves I 6, the symmetrically arranged sliding blocks I 16 being fixedly connected to round rods I 17, the symmetrically arranged round rods I 17 being arranged in the symmetrically arranged circular arc grooves 14, and the round rods 17 passing through the sliding blocks III 32.

One of the transverse grooves I 6 is fixedly connected to a gear rack I 25, and the frame body 7 is fixedly connected to a center shaft of a gear I 26 via a bearing, the gear I 26 being engaged with the gear rack I 25, the center shaft of the gear I 26 being fixedly connected to a circular plate 27, and an eccentric position of the circular plate 27 being fixedly connected to a round rod III 28.

The frame body 7 is fixedly connected to a guide plate 15, and a round rod III 28 is arranged in a vertical groove II 31, the vertical groove II 31 being fixedly connected to a square rod 30, the square rod 30 passing through the guide plate 15 and being fixedly connected to the cutting knife 29.

The vertical plate 38 is fixedly connected to an L-shaped plate 39, the L-shaped plate 39 being fixedly connected to one end of a spring 40, and the other end of the spring 40 being fixedly connected to the transverse plate 35.

The frame body 7 is rotatably connected to a baffle plate 8, the baffle plate 8 being fixedly connected to a handle 10.

The baffle plate 8 is threadedly connected to the frame body 7 via symmetrically arranged top screws 9.

Upon the motor 13 is started, the motor 13 drives the threaded rod 11 to rotate, the threaded rod 11 drives the transverse grooves 3 to move along the transverse rod 2, and the transverse grooves 3 drive the sliding blocks II 18 to move. The sliding blocks II 18 drive the round rods II 19 to move along the circular grooves 12, and the round rods II 19, meanwhile, drive the sliding blocks II 18 to move along the transverse grooves 3, and drive the vertical grooves I 20 to swing. The vertical grooves I 20 drive the push plate I 21, the baffle plates II 22, the push plate II 23, the L-shaped rod 34 and the gear rack II 36 to swing, and the round rods II 19 enter the straight grooves 41. The baffle plates II 22 face the groove 24 exactly and enter the groove II 24, and the vertical groove I 20 drives the sliding blocks III 32 to swing. The sliding blocks III 32 drive the round rod I 17 to move along the circular arc grooves 14, and the round rod I 17 drives the sliding blocks I 16 to move along the transverse grooves I 6, and the sliding blocks I 16 drive the transverse grooves I 6 to move along the vertical rods 4. The sliding blocks III 32 drive the bending rod 33, the vertical plate 38, the L-shaped plate 39, the spring 40, the gear II 37 and the transverse plate 35 to swing. When the gear II 37 is engaged with the gear rack II 36, the gear II 37 rotates to drive the transverse plate 35 to swing, and the transverse plate 35 compresses the spring 40 and swings in the direction close to the center of the bottom plate of the frame body 7, allowing *Anabasis aphylla* on the transverse plate 35 to fall onto the bottom plate of the frame body 7 in a sliding manner along the transverse plate 35. The transverse groove I 6 drives the gear rack I 25 to move, and the gear rack I 25 drives the gear I 26 and the circular plate 27 to rotate. The circular plate 27 drives the round rod III 28 to swing along the vertical groove II 31, and the round rod III 28 drives the vertical groove II 31 to move reciprocally. The vertical groove II 31 drives the square rod 30 to move along the guide plate 15, and the square rod 30 drives the cutting knife 29 to move, allowing the cutting knife 29 to contact *Anabasis aphylla* and cut the same.

When more *Anabasis aphylla* are in the frame body 7, the top screws 9 are loosened, and the baffle plate 8 is swung to take out *Anabasis aphylla*.

The working flow of the present disclosure is as follows. The frame body 7 is mounted on the movable equipment, and the movable equipment is driven to move the device to the working area.

The movable equipment is operated intermittently to allow the area formed by the push plate I 21, the baffle plates II 22 and the push plate II 23 to be exactly opposite to a suitable number of *Anabasis aphylla*.

The motor 13 is started to drive the threaded rod 11 to rotate, the threaded rod 11 drives the transverse grooves 3 to move along the transverse rod 2, and the transverse grooves 3 drive the sliding blocks II 18 to move. The sliding blocks II 18 drive the round rods II 19 to move along the circular grooves 12, and the round rods II 19, meanwhile, drive the sliding blocks II 18 to move along the transverse grooves 3, and drive the vertical grooves I 20 to swing. The vertical grooves I 20 drive the push plate I 21, the baffle plates II 22, the push plate II 23, the L-rod 34 and the gear rack II 36 to swing, and the round rods II 19 enter the straight grooves 41, and the baffle plates II 22 face the groove 24 exactly, so that the push plate I 21, the baffle plates II 22 and the push plate II 23 encircle *Anabasis aphylla*. The push plate I 21 and the push plate II 23 push *Anabasis aphylla* to move towards the middle. The baffle plates II enter the grooves 24. The vertical groove I 20 drives the sliding blocks III 32 to swing, and the sliding blocks III 32 drive the round rod I 17 to move along the circular arc groove 14. The round rod I 17 drives the sliding blocks I 16 to move along the transverse grooves I 6, and the sliding blocks I 16 drive the transverse grooves I 6 to move along the vertical rods 4. The sliding blocks III 32 drive the bending rod 33, the vertical plate 38, the L-shaped plate 39, the spring 40, the gear II 37 and the transverse plate 35 to swing, so that the transverse plate 35 pushes *Anabasis aphylla* to form into > shape, with an opening towards the push plate II 23. When the gear II 37 is engaged with the gear rack II 36, the gear II 37 rotates to drive the transverse plate 35 to swing, and the transverse plate 35 compresses the spring 40 and swings in the direction close to the center of the bottom plate of the frame body 7, allowing *Anabasis aphylla* on the transverse plate 35 to fall onto the bottom plate of the frame body 7 in a sliding manner along the transverse plate 35. The transverse groove I 6 drives the gear rack I 25 to move, and the gear rack I 25 drives the gear I 26 and the circular plate 27 to rotate. The circular plate 27 drives the round rod III 28 to swing along the vertical groove II 31, and the round rod III 28 drives the vertical groove II 31 to move reciprocally. The vertical groove II 31 drives the square rod 30 to move along the guide plate 15, and the square rod 30 drives the cutting knife 29 to move, allowing the cutting knife 29 to contact *Anabasis aphylla* and cut the same along the position slightly above the transverse plate 35, thereby realizing the cutting of *Anabasis aphylla*.

The motor 13 is started in reverse to move the transverse plate 35 in reverse. *Anabasis aphylla* falls onto the transverse plate 35 until the transverse plate 35 swings to allow *Anabasis aphylla* to fall onto the bottom plate of the frame body 7. The motor 13 is started to restore the transverse plate 35 to be horizontal.

When more *Anabasis aphylla* are in the frame body 7, the top screws 9 are loosened, and the baffle plate 8 is swung to take out *Anabasis aphylla*.

According to the present disclosure, by arranging the circular grooves 12, the straight grooves 41 and the circular arc grooves 14, the push plate I 21, the baffle plates II 22 and the push plate II 23 encircle *Anabasis aphylla* driven by the relevant elements. The push plate I 21 and the push plate II 23 push *Anabasis aphylla* to move towards the middle, and the transverse plate 35 pushes *Anabasis aphylla* to form into a > shape, with an opening towards the push plate II 23, facilitating the cutting knife 29 to cut *Anabasis aphylla*. In addition, after being cut, *Anabasis aphylla* falls automatically onto the transverse plate 35 under the effect of ">shape", realizing the initial collection of *Anabasis aphylla*.

According to the present disclosure, the gear II 37 is engaged with the gear rack 36. When the gear II 37 is not engaged with the gear rack II 36, the transverse plate 35 keeps horizontal by utilizing the elastic effect of the spring 40. When the gear II 37 is engaged with the gear rack II 36, the transverse plate 35 swings in the direction close to the center of the bottom plate of the frame body 7, which facilitates *Anabasis aphylla* to fall onto the bottom plate of the frame body 7 along the transverse plate 35, thereby realizing the collection of *Anabasis aphylla*.

According to the present disclosure, by clever design, manually cutting and picking up of *Anabasis aphylla* is replaced, effectively replacing manpower, and improving work efficiency.

The above disclosed is only the specific example of the present disclosure, but the present disclosure is not limited to this. Any variations that can be thought of by any skilled in the art are to be included in the scope of protection of the present disclosure.

The invention claimed is:

1. A mowing method for compensatory growth of a desert plant *Anabasis aphylla*, comprising:
   a frame body (7), symmetrically arranged circular grooves (12) and straight grooves (41) being disposed on the frame body (7), the symmetrically arranged circular grooves (12) being communicated with the straight grooves (41), and symmetrically arranged circular arc grooves (14) being disposed on the frame body (7),
   the frame body (7) being fixedly connected to a motor (13), an output shaft of the motor (13) being fixedly connected to a threaded rod (11), and two reverse threads of the threaded rod (11) being threadedly connected to corresponding transverse grooves (3),
   sliding blocks II (18) being embedded in the symmetrically arranged transverse grooves (3), the symmetrically arranged sliding blocks II (18) being fixedly connected to round rods II (19), and the symmetrically arranged round rods II (19) matching the corresponding circular grooves (12) and the straight grooves (41), and being fixedly connected to vertical grooves I (20),
   one of the vertical grooves I (20) being fixedly connected to a push plate I (21), and the symmetrically arranged push plate I (21) being fixedly connected to symmetrically arranged baffle plates II (22),
   another of the vertical grooves I (20) being fixedly connected to a push plate II (23), symmetrically arranged grooves (24) being disposed on the push plate II (23), and the symmetrically arranged baffle plates II (22) matching the symmetrically arranged grooves (24),
   a sliding block III (32) being embedded in the other vertical groove I (20), the sliding block III (32) being fixedly connected to a bending rod (33), the bending rod (33) being fixedly connected to a vertical plate (38), the vertical plate (38) being connected to a center shaft of a gear II (37) via a bearing, and the center shaft of the gear II (37) being fixedly connected to a transverse plate (35),
   the push plate II (23) being fixedly connected to an L-shaped rod (34), the L-shaped rod (34) being fixedly connected to a gear rack II (36), and the gear II (37) matching the gear rack II (36), and
   the frame body (7) being fixedly connected to a guide plate (15), a round rod III (28) being arranged in a vertical groove II (31), the vertical groove II (31) being fixedly connected to a square rod (30), and the square rod (30) passing through the guide plate (15) and being fixedly connected to a cutting knife (29); and
   comprising the following steps of:
   step 1: mounting the frame body (7) on movable equipment;
   step 2: driving the movable equipment to a working area;
   step 3: intermittently operating the movable equipment to allow an area formed by the push plate I (21), the baffle plates II (22) and the push plate II (23) to be exactly opposite to a suitable number of *Anabasis aphylla*;

step 4: starting the motor (13), allowing the push plate I (21), the baffle plates II (22) and the push plate II (23) to encircle *Anabasis aphylla* driven by relevant elements, pushing, by the push plate I (21) and the push plate II (23), *Anabasis aphylla* to move towards a middle, and pushing, by the transverse plate (35), *Anabasis aphylla* to form into a > shape, with an opening of the > shape towards the push plate II (23);

step 5: contacting, by the cutting knife (29), *Anabasis aphylla* and cutting the same along a position slightly above the transverses plate (35); and step 6: starting the motor (13) in reverse to move the transverse plate (35) in reverse, *Anabasis aphylla* falling onto the transverse plate (35) until the transverse plate (35) swings to allow *Anabasis aphylla* to fall onto a bottom plate of the frame body (7), and starting the motor (13) to restore the transverse plate (35) to be horizontal.

2. The mowing method for compensatory growth of a desert plant *Anabasis aphylla* according to claim 1, wherein the frame body (7) is fixedly connected to symmetrically arranged square blocks I (1), the symmetrically arranged square blocks I (1) being fixedly connected to a transverse rod (2), and the transverse rod (2) passing through the symmetrically arranged transverse grooves (3).

3. The mowing method for compensatory growth of a desert plant *Anabasis aphylla* according to claim 2, wherein the frame body (7) is fixedly connected to symmetrically arranged square blocks II (5), the symmetrically arranged square blocks II (5) being fixedly connected to vertical rods (4), and the vertical rods (4) passing through transverse grooves I (6), sliding blocks I (16) being embedded in the symmetrically arranged transverse grooves I (6), the symmetrically arranged sliding blocks I (16) being fixedly connected to round rods I (17), the symmetrically arranged round rods I (17) being arranged in the symmetrically arranged circular arc grooves (14), and the round rods (17) passing through the sliding blocks III (32).

4. The mowing method for compensatory growth of a desert plant *Anabasis aphylla* according to claim 3, wherein one of the transverse grooves I (6) is fixedly connected to a gear rack I (25), and the frame body (7) is connected to a center shaft of a gear I (26) via a bearing, the gear I (26) being engaged with the gear rack I (25), a center shaft of the gear I (26) being fixedly connected to a circular plate (27), and an eccentric position of the circular plate (27) being fixedly connected to a round rod III (28).

5. The mowing method for compensatory growth of a desert plant *Anabasis aphylla* according to claim 4, wherein the vertical plate (38) is fixedly connected to an L-shaped plate (39), the L-shaped plate (39) being fixedly connected to one end of a spring (40), and the other end of the spring (40) being fixedly connected to the transverse plate (35).

6. The mowing method for compensatory growth of a desert plant *Anabasis aphylla* according to claim 5, wherein upon the motor (13) is started, the motor (13) drives the threaded rod (11) to rotate, the threaded rod (11) drives the transverse grooves (3) to move along the transverse rod (2), and the transverse grooves (3) drive the sliding blocks II (18) to move; the sliding blocks II (18) drive the round rods II (19) to move along the circular grooves (12), and the round rods II (19), meanwhile, drive the sliding blocks II (18) to move along the transverse grooves (3), and drive the vertical grooves I (20) to swing, the vertical grooves I (20) drive the push plate I (21), the baffle plates II (22), the push plate II (23), the L-shaped rod (34) and the gear rack II (36) to swing, and the round rods II (19) enter the straight grooves (41); the baffle plates II (22) face the groove (24) exactly and enter the groove II (24); the vertical groove I (20) drives the sliding blocks III (32) to swing, the sliding blocks III (32) drive the round rod I (17) to move along the circular arc grooves (14), the round rod I (17) drives the sliding blocks I (16) to move along the transverse grooves I (6), and the sliding blocks I (16) drive the transverse grooves I (6) to move along the vertical rods (4); the sliding blocks III (32) drive the bending rod (33), the vertical plate (38), the L-shaped plate (39), the spring (40), the gear II (37) and the transverse plate (35) to swing; when the gear II (37) is engaged with the gear rack II (36), the gear II (37) rotates to drive the transverse plate (35) to swing, and the transverse plate (35) compresses the spring (40) and swings in the direction close to a center of the bottom plate of the frame body (7), allowing *Anabasis aphylla* on the transverse plate (35) to fall onto the bottom plate of the frame body (7) in a sliding way along the transverse plate (35); and the transverse groove I (6) drives the gear rack I (25) to move, the gear rack I (25) drives the gear I (26) and the circular plate (27) to rotate, the circular plate (27) drives the round rod III (28) to swing along the vertical groove II (31), the round rod III (28) drives the vertical groove II (31) to move reciprocally, the vertical groove II (31) drives the square rod (30) to move along the guide plate (15), and the square rod (30) drives the cutting knife (29) to move, allowing the cutting knife (29) to contact *Anabasis aphylla* and cut the same.

7. The mowing method for compensatory growth of a desert plant *Anabasis aphylla* according to claim 1, wherein the frame body (7) is rotatably connected to a baffle plate (8), the baffle plate (8) being fixedly connected to a handle (10).

8. The mowing method for compensatory growth of a desert plant *Anabasis aphylla* according to claim 7, wherein the baffle plate (8) is threadedly connected to the frame body (7) via symmetrically arranged top screws (9).

9. The mowing method for compensatory growth of a desert plant *Anabasis aphylla* according to claim 8, wherein when more *Anabasis aphylla* are in the frame body (7), the top screws (9) are loosened, and the baffle plate (8) is swung to take out *Anabasis aphylla*.

* * * * *